United States Patent
Deng et al.

(10) Patent No.: US 11,245,338 B2
(45) Date of Patent: Feb. 8, 2022

(54) ALTERNATING CURRENT-DIRECT CURRENT CONVERSION CIRCUIT, ALTERNATING CURRENT-DIRECT CURRENT CONVERSION METHOD AND CHARGER

(71) Applicant: Silergy Semiconductor Technology (Hangzhou) LTD, Hangzhou (CN)

(72) Inventors: Jian Deng, Hangzhou (CN); Qiukai Huang, Hangzhou (CN)

(73) Assignee: Silergy Semiconductor Technology (Hangzhou) LTD, Hangzhou (CN)

( * ) Notice: Subject to any disclaimer, the term of this patent is extended or adjusted under 35 U.S.C. 154(b) by 0 days.

(21) Appl. No.: 16/830,630

(22) Filed: Mar. 26, 2020

(65) Prior Publication Data

US 2020/0321886 A1    Oct. 8, 2020

(30) Foreign Application Priority Data

Apr. 3, 2019    (CN) .......................... 201910267274.X

(51) Int. Cl.
| | |
|---|---|
| *H02M 7/10* | (2006.01) |
| *H02J 7/02* | (2016.01) |
| *H02M 7/06* | (2006.01) |
| *H02M 7/217* | (2006.01) |

(52) U.S. Cl.
CPC .................. *H02M 7/10* (2013.01); *H02J 7/02* (2013.01); *H02M 7/06* (2013.01); *H02M 7/217* (2013.01); *H02J 2207/20* (2020.01)

(58) Field of Classification Search
CPC .......... H02M 7/06; H02M 7/062; H02M 7/10; H02M 7/125; H02M 7/155; H02M 7/1555; H02M 1/10; H02M 1/4225; H02H 7/125; H02H 7/1216; H02J 7/02; H02J 7/045; H02J 2207/40; H02J 2207/20; Y02B 40/00; Y02B 70/10

See application file for complete search history.

(56) References Cited

U.S. PATENT DOCUMENTS

| | | | | |
|---|---|---|---|---|
| 5,119,283 | A | * 6/1992 | Steigerwald | ............ H02M 1/10 363/37 |
| 6,005,780 | A | 12/1999 | Hua | |
| 6,147,882 | A | * 11/2000 | Huber | ................. H02M 1/4258 363/39 |
| 6,154,380 | A | * 11/2000 | Assow | ................. H02M 1/4225 363/61 |
| 6,580,258 | B2 | 6/2003 | Wilcox et al. | |
| 9,325,254 | B2 | 4/2016 | Deng et al. | |
| 9,331,588 | B2 | 5/2016 | Chen | |
| 9,488,680 | B2 | 11/2016 | Xu | |
| 2003/0043607 | A1 * | 3/2003 | Vinciarelli | .......... H02M 1/4208 363/61 |

(Continued)

FOREIGN PATENT DOCUMENTS

| | | | |
|---|---|---|---|
| CN | 102290807 | A | * 12/2011 |
| CN | 103795281 | A | * 5/2014 |

*Primary Examiner* — Thienvu V Tran
*Assistant Examiner* — Shahzeb K Ahmad

(57) ABSTRACT

An AC-DC conversion circuit can include an adaptive rectifier configured to receive an AC input voltage with different ranges, where operation states of the adaptive rectifier are adjusted according to a range of the AC input voltage, in order to decrease a fluctuation range of a DC output voltage of the adaptive rectifier.

20 Claims, 7 Drawing Sheets

(56) References Cited

U.S. PATENT DOCUMENTS

| | | | |
|---|---|---|---|
| 2004/0027840 A1* | 2/2004 | Leisten | H02M 1/4266 |
| | | | 363/44 |
| 2007/0217093 A1* | 9/2007 | Xue | H05B 41/2853 |
| | | | 361/18 |
| 2009/0303762 A1* | 12/2009 | Jang | H02M 1/4208 |
| | | | 363/61 |
| 2010/0061128 A1* | 3/2010 | Nakamoto | H02M 7/2176 |
| | | | 363/126 |
| 2011/0019452 A1* | 1/2011 | Shinomoto | H02M 7/217 |
| | | | 363/126 |
| 2014/0078789 A1 | 3/2014 | Li et al. | |
| 2014/0239934 A1 | 8/2014 | Zhang | |
| 2015/0078043 A1* | 3/2015 | Harkin | H02M 1/10 |
| | | | 363/37 |
| 2015/0160270 A1 | 6/2015 | Shi et al. | |
| 2015/0280578 A1 | 10/2015 | Huang et al. | |
| 2018/0234028 A1* | 8/2018 | Chen | H02M 1/4233 |

\* cited by examiner

ALTERNATING CURRENT-DIRECT CURRENT CONVERSION CIRCUIT, ALTERNATING CURRENT-DIRECT CURRENT CONVERSION METHOD AND CHARGER

RELATED APPLICATIONS

This application claims the benefit of Chinese Patent Application No. 201910267274.X, filed on Apr. 3, 2019, which is incorporated herein by reference in its entirety.

FIELD OF THE INVENTION

The present invention generally relates to the field of power electronics, and more particularly to AC-DC conversion circuits, AC-DC conversion methods, and chargers.

BACKGROUND

A switched-mode power supply (SMPS), or a "switching" power supply, can include a power stage circuit and a control circuit. When there is an input voltage, the control circuit can consider internal parameters and external load changes, and may regulate the on/off times of the switch system in the power stage circuit. Switching power supplies have a wide variety of applications in modern electronics. For example, switching power supplies can be used to drive light-emitting diode (LED) loads.

DETAILED DESCRIPTION

Reference may now be made in detail to particular embodiments of the invention, examples of which are illustrated in the accompanying drawings. While the invention may be described in conjunction with the preferred embodiments, it may be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it may be readily apparent to one skilled in the art that the present invention may be practiced without these specific details. In other instances, well-known methods, procedures, processes, components, structures, and circuits have not been described in detail so as not to unnecessarily obscure aspects of the present invention.

Figure 1:
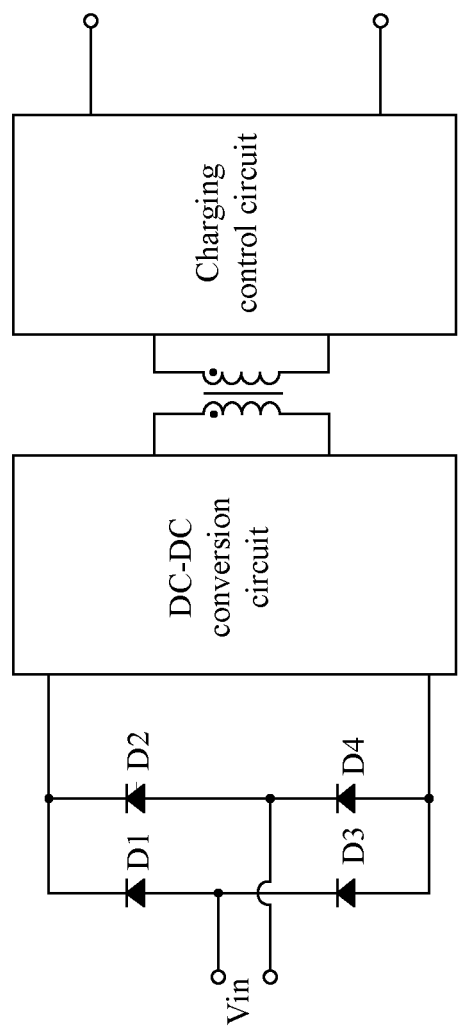
FIG. 1 is a schematic block diagram of an example charger.

With the popularity and use of mobile phones and computers, chargers are becoming increasingly widely used. For example, range of an AC input voltage can be from 100V to 240V in applications of PD chargers or QC chargers. FIG. 1 shows a schematic block diagram of an example charger. For example, the charger can include an AC-DC conversion circuit, a DC-DC conversion circuit, and a charging control circuit. Output terminals of the AC-DC conversion circuit may be coupled to input terminals of the DC-DC conversion circuit, and output terminals of the DC-DC conversion circuit can be coupled to input terminals of the charging control circuit. In this example, the AC-DC conversion circuit is a normal full bridge rectifier. Thus, the input voltage of DC-DC conversion circuit can be in a great range after the normal full bridge rectifier converts AC voltages ranging from 100V to 240V into DC voltages. In such case, it may not be profitable for optimization of the power devices of post stages and the volume of the charger may increase. By adjusting the range of the input voltage of DC-DC conversion circuit, optimization of power devices of post stages can be realized, and a smaller volume of the charger can be obtained.

Figure 2:
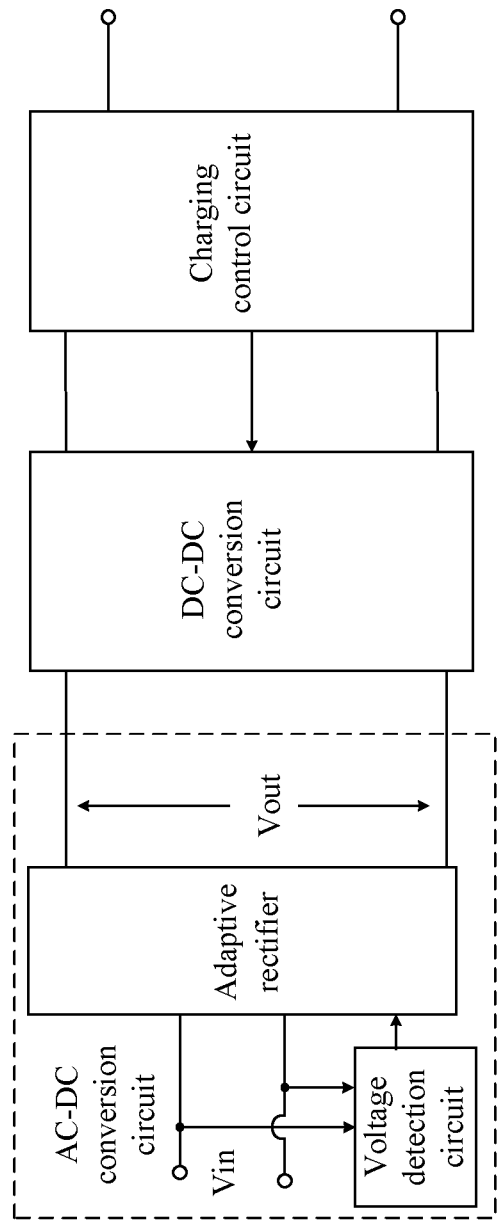
FIG. 2 is a schematic block diagram of an example charger, in accordance with embodiments of the present invention.

Referring now to FIG. 2, shown is a schematic block diagram of an example charger, in accordance with embodiments of the present invention. In this particular example, the charger can include an AC-DC conversion circuit, a DC-DC conversion circuit, and a charging control circuit. For example, output terminals of the AC-DC conversion circuit may be coupled to input terminals of the DC-DC conversion circuit, output terminals the DC-DC conversion circuit can be coupled to input terminals of the charging control circuit, and output terminals of the charging control circuit can be coupled to the charging device. The AC-DC conversion circuit can include an adaptive rectifier configured to receive an AC input voltage in different ranges, and the operation states of the adaptive rectifier can be adjusted according to the range of the AC input voltage. Thus, the fluctuation range of the DC output voltage of the adaptive rectifier can be decreased.

When the AC input voltage is in a relatively low voltage range, the adaptive rectifier can operate in a boost mode in order to increase the DC output voltage. Therefore, the DC output voltage generated when the AC input voltage is in the low voltage range can approach the DC output voltage when the AC input voltage is in the high voltage range. When the AC input voltage is in a high voltage range, the adaptive rectifier can operate in a buck mode in order to decrease the DC output voltage. Thereby, the DC output voltage generated when the AC input voltage is in the low voltage range may approach the DC output voltage when the AC input voltage is in the high voltage range.

In particular embodiments, the adaptive rectifier may operate in one of the boost mode and the buck mode. In other examples, the operation mode of the adaptive rectifier can include both the boost mode and the buck mode. For example, the low voltage range of the AC input voltage can be from about 90V to about 160V, and the high voltage range of the AC input voltage can be from about 190V to about 290V. In other examples, the low voltage range of the AC input voltage can be from about 110V to about 130V, and the high voltage range of the AC input voltage can be from about 220V to about 260V. It should be understood that the "high" voltage range and the "low" voltage range are merely relative, and the high and low voltage ranges can overlap in some cases (e.g., including the same value), or may be two separate ranges. In the following description, the low voltage of the AC input voltage is, e.g., 110V and the high voltage of the AC input voltage is, e.g., 220V.

In particular embodiments, a fluctuation range of the DC output voltage of the adaptive rectifier can be decreased by switching the operation mode of the adaptive rectifier with different AC input voltages. Thus, the DC output voltage of AC-DC conversion circuit can remain the same or the variation of the DC output voltage of AC-DC conversion circuit may not be greater than about 20%. When the AC input voltage is in the low voltage range, the adaptive rectifier can operate in the boost mode in order to increase the DC output voltage. Therefore, the DC output voltage generated when the AC input voltage is in the low voltage range may approach the DC output voltage generated when the AC input voltage is in the high voltage range. Similarly, when the AC input voltage is in the high voltage range, the adaptive rectifier can operate in the buck mode to decrease the DC output voltage. Therefore, the DC output voltage generated when the AC input voltage is in the low voltage range may approach the DC output voltage generated when the AC input voltage is in the high voltage range.

Thus, the volume of the filter circuit in the AC-DC conversion circuit can be reduced, such as by way of a filtering capacitor. Further, when the DC output voltage is used as a power supply voltage to provide power to the subsequent circuits, the withstand voltage requirements of the components in the subsequent circuits may be reduced. For example, when the subsequent circuit is the DC-DC converter, the power switches of the DC-DC converter can be selected to have lower withstand voltages, which can facilitate the selection and manufacture of power transistors. Moreover, the withstand voltage requirements of inductive components (e.g., the transformer) can be correspondingly reduced, such that the volume of the inductive component is reduced, thereby greatly reducing the manufacturing process and associated costs. In this way, the stability of the system can be improved.

In one embodiment, the AC-DC conversion circuit may also include a voltage detection circuit that can obtain information of the AC input voltage. For example, the voltage detection circuit can receive the AC input voltage Vin to generate a first signal that represents the range of the AC input voltage. The operation state of the adaptive rectifier can be adjusted according to the first signal. In addition, the DC-DC conversion circuit can include an isolated switching power, such as a LLC resonant circuit, a flyback circuit, and a forward circuit. The charging control circuit can obtain a charging control signal of the charging device such as a charging voltage or a charging current. Then a feedback signal representative of the charging signal may be fed back to the DC-DC conversion circuit. Thus the DC-DC conversion circuit can generate the corresponding current in order to satisfy the charging requirements for the charging device.

Figure 3:
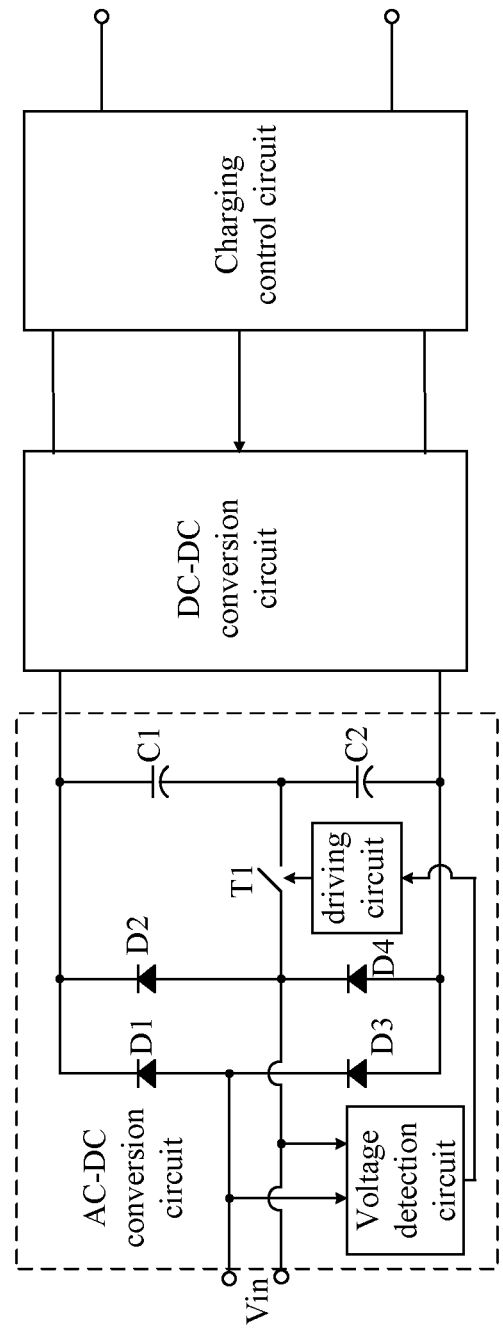
FIG. 3 is a schematic block diagram of a first example AC-DC conversion circuit, in accordance with embodiments of the present invention.

Referring now to FIG. 3, shown is a schematic block diagram of a first example AC-DC conversion circuit, in accordance with embodiments of the present invention. In this particular example, the AC-DC conversion circuit can include an adaptive rectifier that includes a full bridge rectifier, a first power device, and capacitors C1 and C2. Here, the full bridge rectifier can include a first input terminal, a second input terminal, a first output terminal, and a second output terminal. Also, the first and second input terminals of the full bridge rectifier can receive AC input voltage Vin, and capacitors C1 and C2 connected in series between the first and second output terminals. One terminal of the first power device can connect to the second input terminal, and another terminal of the first power device can connect with the common node of capacitors C1 and C2. In other embodiments, one terminal of the first power device can connect with the first input terminal rather than the second input terminal. In addition, the first power device (e.g., transistor T1) can bear a positive or negative voltage. It should be understood that the first power device can be a switch, a transistor, two switches coupled to each other in series, a switch component including a transistor, and any other switch device with on and off functionality.

The full bridge rectifier can include diode D1, diode D2, diode D3, and diode D4. Here, both cathodes of diodes D1 and D2 can connect to the first output terminal. In addition, an anode of diode D1 can connect with the first input terminal, and an anode of diode D2 can connect with the second input terminal. In addition, both anodes of diodes D3 and D4 can connect to the second output terminal, a cathode of diode D3 can connect to the first input terminal, and a cathode of diode D4 can connect to the second input terminal. The AC-DC conversion circuit can also include a voltage detection circuit that receives the AC input voltage. Then, a first signal that represents the range of the AC input voltage may be generated by the voltage detection circuit to control on and off states of the first power device, in order to adjust the operation state of the adaptive rectifier.

When AC input voltage Vin is in the low voltage range, transistor T1 can be turned on. During each positive half cycle, AC input voltage Vin can charge capacitor C1 through diode D1 and transistor T1, and the maximum voltage across capacitor C1 may be the peak value of AC input voltage Vin. At the same time, capacitor C2 can be discharged. The sum of the voltages across capacitors C1 and C2 may be taken as the input voltage of the DC-DC conversion circuit to supply power for other circuits in the post stage. During each negative half cycle, AC input voltage Vin can charge capacitor C2 through diode D3 and transistor T1, and the maximum voltage across capacitor C2 may be the peak value of AC input voltage Vin. At the same time, capacitor C1 can be discharged. The sum of the voltages across capacitors C1 and C2 may be taken as the input voltage of the DC-DC conversion circuit to supply power for other circuits in the post stage.

When input AC voltage Vin is in the high voltage range, transistor T1 can be turned off. After that, the adaptive rectifier can operate as a normal full bridge rectifier. In such a case, the sum of the voltages across capacitors C1 and C2 may be taken as the output voltage of the normal full bridge rectifier in order to supply power for other circuits in the post stage. Also, both the maximum voltage across capacitor C1 and the maximum voltage across capacitor C2 may be half of the peak value of AC input voltage Vin.

In particular embodiments, the adaptive rectifier can operate as a voltage doubler rectifier when the AC input voltage is in the low voltage range. That is to say, the maximum of DC output voltage Vout of the adaptive rectifier can be twice the peak value of AC input voltage Vin. Moreover, the adaptive rectifier can operate as a normal full bridge rectifier when the AC input voltage is in the high voltage range. That is to say, the maximum DC output voltage Vout of the adaptive rectifier may nearly be equal to the peak value of input AC voltage Vin. Thus, DC output voltage Vout generated when AC input voltage Vin is in the low voltage range may be nearly the same as DC output voltage Vout generated when AC input voltage Vin is in the high voltage range. In some embodiments, if the high AC input voltage is twice the low AC input voltage, the DC output voltage can be the same. For example, if the high AC input voltage is 220V, and the low AC input voltage is 110V, both the two DC output voltages generated respectively under the condition of the low voltage range and the high voltage range may be 220V. In other embodiments, the fluctuation range of the DC output voltage can be controlled in a certain fluctuation range, such as about 20%.

Figure 4:
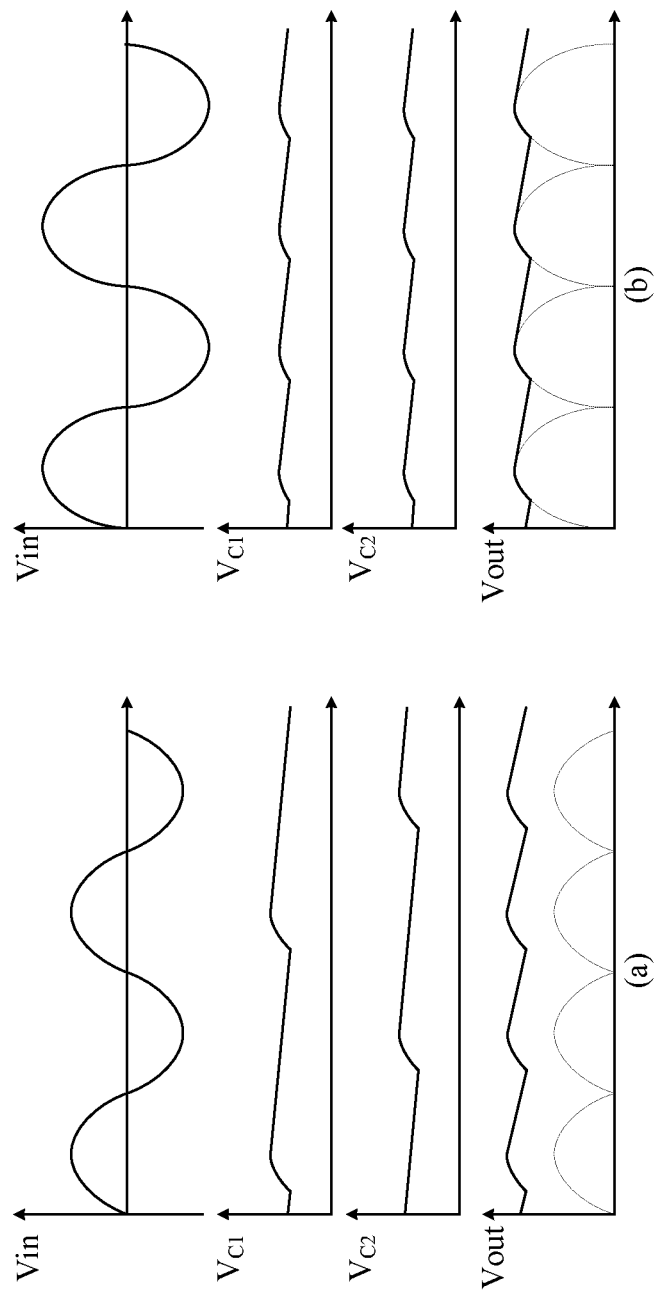
FIG. 4 is a waveform diagram of an example operation of the first example AC-DC conversion circuit, in accordance with embodiments of the present invention.

Referring now to FIG. 4, shown is a waveform diagram of an example operation of the first example AC-DC conversion circuit, in accordance with embodiments of the present invention. In this example, Vc1 is the voltage across capacitor C1, and Vc2 is the voltage across capacitor C2, while Vout is the DC output voltage and equals to the sum of Vc1 and Vc2. In FIG. 4, (a) and (b) are waveform diagrams of examples operation of the first example AC-DC conversion circuit when the AC input voltage is in the low voltage range, and in the high voltage range, respectively. It can be seen from (a) that the maximum voltage of DC output voltage Vout is twice the peak value of AC input voltage Vin when AC input voltage Vin is in the low voltage range. Similarly, it can be seen from (b) that the maximum voltage of DC output voltage Vout is the same as the peak value of AC input voltage Vin when AC input voltage Vin is in the high voltage range. By comparing DC output voltages Vout in (a) and (b) of FIG. 4, it can be seen that DC output voltage Vout generated when AC input voltage Vin is in the high voltage range may approach DC output voltage Vout generated when AC input voltage Vin is in the low voltage range.

Figure 5:
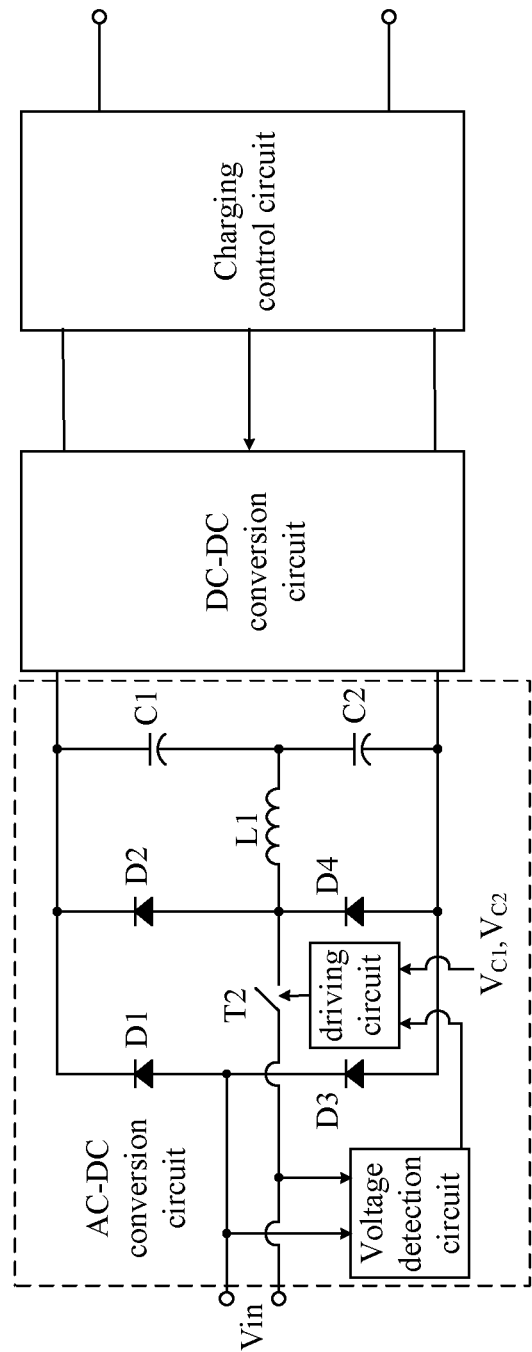
FIG. 5 is a schematic block diagram of a second example AC-DC conversion circuit, in accordance with embodiments of the present invention.

Referring now to FIG. 5, shown is a schematic block diagram of a second example AC-DC conversion circuit, in accordance with embodiments of the present invention. In particular embodiments, the AC-DC conversion circuit can include an adaptive rectifier that includes a full bridge rectifier, a switching regulator, capacitors C1 and C2. In addition, the switching regulator can multiplex at least two rectifying transistors of the full bridge rectifier, and convert AC input voltage Vin into the voltages across capacitors C1 and C2. Moreover, the sum of the voltages across capacitors C1 and C2 may be taken as DC output voltage Vout of the adaptive rectifier. The switching regulator can multiplex at least one rectifying transistor of the full bridge rectifier during each positive half cycle and each negative half cycle, and output voltages of the switching regulator can be the voltages across capacitors C1 and C2, respectively, during each positive half cycle and each negative half cycle. It should be noted that though the switching regulator is a buck circuit in this particular example, the switching regulator can be any circuitry having buck functionality.

In particular embodiments, the switching regulator can also include a second power device (e.g., T2) and inductor L1. Here, the full bridge rectifier can include first and second input terminals, and first and second output terminals. Also, the first and second input terminals of the full bridge rectifier may receive AC input voltage Vin, and capacitors C1 and C2 can connect in series between the first and second output terminals. One terminal of inductor L1 can connect with the second input terminal, and another terminal of inductor L1 can connect with the common terminal of capacitors C1 and C2. In other embodiments, one terminal of inductor L1 is connected with the first input terminal and another terminal of inductor L1 is connected with the common node of capacitors C1 and C2. In addition, the second power device (e.g., T2) may bear a positive or negative voltage. Furthermore, the second power device can be a switch, a transistor, two switches coupled to each other in series, a switch component including a transistor, or any suitable switch device with on and off functionality.

The AC-DC conversion circuit can also include a voltage detection circuit that receives the AC input voltage. Then, a first signal that represents the range of the AC input voltage may be generated by the voltage detection circuit to control on and states of transistor T2, in order to adjust the operation state of the adaptive rectifier. When AC input voltage Vin is in the low voltage range, transistor T2 can be turned on. During each positive half cycle, AC input voltage Vin can charge capacitor C1 through diode D1, inductor L1, and transistor T2, and the maximum voltage of capacitor C1 may be the peak value of AC input voltage Vin. At the same time, capacitor C2 can be discharged. The sum of the voltages across capacitors C1 and C2 may be taken as the input voltage of the DC-DC conversion circuit to supply power for other circuit in the post stage. During each negative half cycle, AC input voltage Vin can charge capacitor C2 through diode D3, inductor L1, and transistor T2, and the maximum voltage of capacitor C2 may be the peak value of AC input voltage Vin. At the same time, capacitor C1 can be discharged. The sum of the voltages across capacitors C1 and C2 may be taken as the input voltage of the DC-DC conversion circuit to supply power for other circuits in the post stage.

When AC input voltage Vin is in the high voltage range, transistor T2 can operate in a pulse-width modulation (PWM) state to be turned on and off by the first signal. In such a case, during each positive half cycle, when transistor T2 is on, input voltage Vin can charge capacitor C1 through diode D1, transistor T2, and inductor L1. When transistor T2 is off, inductor L1 can release energy with the current flowing through diode D2. At the same time, transistor T2, diode D2, and inductor L1 may form a buck circuit with multiplex diode D2. Also, the output voltage of the buck circuit can be the voltage across capacitor C1, and thus the buck circuit can control the voltage across capacitor C1 to be a preset value. Here, capacitor C2 may be discharged during the positive half cycle. In addition, the sum of the voltages across capacitors C1 and C2 may be taken as the input voltage of the DC-DC conversion circuit to supply power for other circuits in the post stage.

Further, during each negative half cycle, when transistor T2 is on, input voltage Vin can charge capacitor C2 through diode D3, transistor T2, and inductor L1. When transistor T2 is off, inductor L1 may release energy with the current flowing through diode D4. At the same time, transistor T2, diode D4, and inductor L1 may form a buck circuit with multiplex diode D4. Also, the output voltage of the buck circuit may be the voltage across capacitor C2, and thus the buck circuit can control the voltage across capacitor C2 to be a preset value. Here, capacitor C1 may be discharged during the negative half cycle. In addition, the sum of the voltages across capacitors C1 and C2 can be taken as the input voltage of the DC-DC conversion circuit to supply power for other circuits in the post stage.

In particular embodiments, the adaptive rectifier may operate as a voltage doubler rectifier when AC input voltage is in the low voltage range. That is to say, the maximum voltage of DC output voltage Vout can be twice the peak value of AC input voltage Vin. Moreover, the adaptive rectifier can operate as a buck circuit when AC input voltage is in the high voltage range. That is to say, DC output voltage Vout may be twice the output voltage of the buck circuit. By adjusting the duty cycle of the buck circuit, the DC output voltage generated when AC input voltage is in the low voltage range may approach the DC output voltage generated when AC input voltage is in the high voltage range. For example, if the high input voltage Vin is 220V and the low input voltage Vin is 110V, and the duty cycle of the buck circuit is 50%, both the DC output voltages generated respectively under the condition of the low voltage range and the high voltage range are 220V. In other embodiments, the fluctuation range of the DC output voltage can be controlled in a certain range, such as 20%.

When AC input voltage Vin is in the high voltage range, the output voltage of the buck circuit can be controlled according to the duty cycle of the buck circuit to control the voltages across capacitors C1 and C2. In some embodiments, the duty cycle of the buck circuit can be calculated in accordance with AC input voltage Vin. After that, transistor T2 can be controlled to be turned on or off directly according to a pulse signal. In other embodiments, a PWM signal for controlling the buck circuit can be generated based on the output voltage feedback signal representing the DC output voltage of buck circuit. Further, in the second example, transistor T2 can be controlled to be turned on or off by sampling the voltage feedback signals representing the voltage across capacitors C1 and C2 respectively during each positive half cycle and each negative half cycle.

For example, during each positive half cycle and each negative half cycle, the voltage across capacitor C1 (Vc1) and capacitor C2 (Vc2) can be sampled respectively to be the feedback signals. Then, the feedback signals and a first reference signal may be controlled to be input signals of the error amplifier. The error amplifier can generate a compensation signal. The PWM signal may be generated by comparing the compensation signal against a ramp signal. In particular embodiments, the duty cycle of the buck circuit can be set based on circuit requirements.

Figure 6:
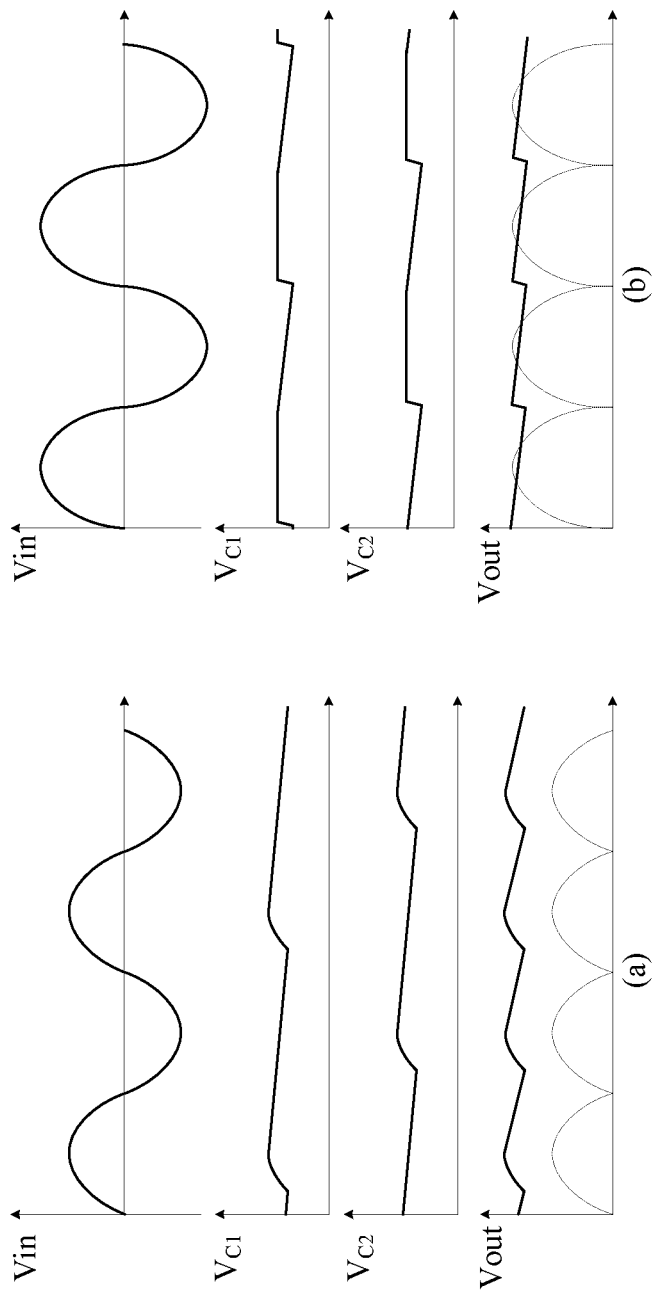
FIG. 6 is a waveform diagram of an example operation of the second example AC-DC conversion circuit, in accordance with embodiments of the present invention.

Referring now to FIG. 6, shown is a waveform diagram of an example operation of the second example AC-DC conversion circuit, in accordance with embodiments of the present invention. In this example, Vc1 is the voltage across capacitor C1, Vc2 is the voltage across capacitor C2, and Vout is the DC output voltage and equals the sum of Vc1 and Vc2. In FIG. 6, (a) and (b) are waveform diagrams of examples operation of the second example AC-DC conversion circuit when the AC input voltage is in the low voltage range and in the high voltage range, respectively. It can be seen from (a) that the maximum voltage of DC output voltage Vout is twice the peak value of AC input voltage Vin when AC input voltage Vin is in the low voltage range. Similarly, it can be seen from (b) that the maximum voltage of DC output voltage Vout is nearly the same as the peak value of AC input voltage Vin when AC input voltage Vin is in the high voltage range. By comparing DC output voltage Vout in (a) and (b), it can be seen that DC output voltage Vout generated when AC input voltage Vin is in the high voltage range can approach DC output voltage Vout generated when AC input voltage Vin is in the low voltage range.

Figure 7:
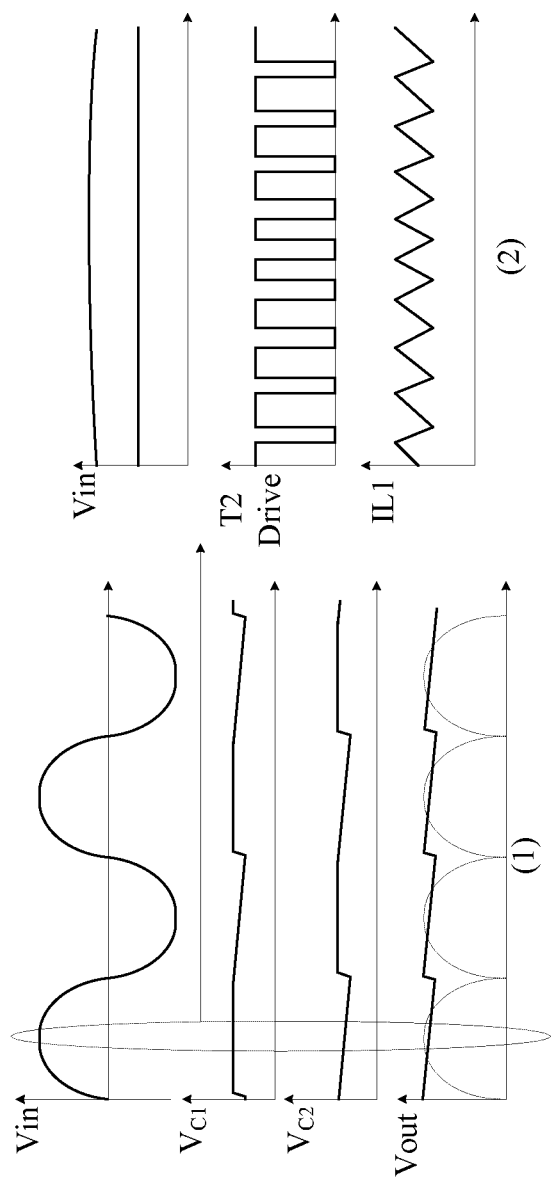
FIG. 7 is a signal waveform diagram of an example driving control of the second example AC-DC conversion circuit, in accordance with embodiments of the present invention.

Referring now to FIG. 7, shown is a waveform diagram of an example driving control of the second example AC-DC conversion circuit, in accordance with embodiments of the present invention. In FIG. 7, (1) is a waveform diagram of an example operation of the second example AC-DC conversion circuit when the AC input voltage is in the high voltage range, and (2) is a signal waveform diagram illustrating the operation of the second example AC-DC conversion circuit during a short period of time shown in the dotted ellipse. In FIG. 7, Vin is the AC input voltage, transistor T2 drive is the driving control signal of transistor T2, and IL1 is the inductance current. It can be seen that the change of AC input voltage is relatively small within a period of time, transistor T2 operates in the PWM state to turn on and off alternately, and the driving control signal of transistor T2 is a PWM signal.

In the first and second examples, DC output voltage Vout is twice AC input voltage Vin when AC input voltage Vin is in the low voltage range. Moreover, in the second example, DC output voltage Vout can be controlled by the buck circuit. Thus, the requirement for the range of the AC input voltage can be reduced, and the circuit may be more flexible in the second example. It should be understood that the voltage detection circuit may not be coupled to the control terminal of the transistor directly in other embodiments.

The embodiments were chosen and described in order to best explain the principles of the invention and its practical applications, to thereby enable others skilled in the art to best utilize the invention and various embodiments with modifications as are suited to particular use(s) contemplated. It is intended that the scope of the invention be defined by the claims appended hereto and their equivalents.

What is claimed is:

1. An AC-DC conversion circuit, comprising:
   a) an adaptive rectifier configured to receive an AC input voltage with different ranges;
   b) wherein operation states of the adaptive rectifier are adjusted according to a range of the AC input voltage, in order to decrease a fluctuation range of a DC output voltage of the adaptive rectifier; and
   c) a power device coupled to the AC input voltage, and when the power device is also coupled to an inductor, the power device being configured to be turned on when the AC input voltage is in a low voltage range, and to operate in a pulse-width modulation (PWM) mode when the AC input voltage is in a high voltage range.

2. The AC-DC conversion circuit of claim 1, wherein:
   a) the adaptive rectifier is configured to operate in a boost mode when the AC input voltage is in the low voltage range, in order to increase the DC output voltage; and
   b) the DC output voltage that is generated when the AC input voltage is in the low voltage range approaches the DC output voltage that is generated when the AC input voltage is in the high voltage range.

3. The AC-DC conversion circuit of claim 1, wherein:
   a) the adaptive rectifier is configured to operate in a buck mode when the AC input voltage is in the high voltage range, in order to decrease the DC output voltage; and
   b) the DC output voltage that is generated when the AC input voltage is in the low voltage range approaches the DC output voltage that is generated when the AC input voltage is in the high voltage range.

4. The AC-DC conversion circuit of claim 1, wherein the adaptive rectifier is configured to operate as a voltage doubler rectifier when the AC input voltage is in the low voltage range, and to operate as a full bridge rectification circuit when the AC input voltage is in the high voltage range.

5. The AC-DC conversion circuit of claim 1, wherein the adaptive rectifier comprises:
   a) a full bridge rectifier having first and second input terminals for receiving the AC input voltage, and first and second output terminals for generating the DC output voltage;

b) first and second capacitors coupled in series between the first and second output terminals; and c) the power device having one terminal coupled to the first or second input terminal, and another terminal coupled to a common node of the first and second capacitors.

6. The AC-DC conversion circuit of claim 5, further comprising a voltage detection circuit configured to generate a first signal that represents a range of the AC input voltage to control operation states of the power device, thereby adjusting the operation states of the adaptive rectifier.

7. The AC-DC conversion circuit of claim 6, wherein the first signal is generated to control the first power device to be turned on when the AC input voltage is in the low voltage range, and to control the power device to be turned off when the AC input voltage is in the high voltage range.

8. The AC-DC conversion circuit of claim 7, wherein:
a) when the power device is turned on, the AC input voltage charges the first capacitor during each positive half cycle, and charges the second capacitor during each negative half cycle, respectively; and
b) the sum of the voltages across the first and second capacitors is taken as the DC output voltage of the adaptive rectifier.

9. The AC-DC conversion circuit of claim 5, wherein the power device is configured to bear a positive or negative voltage.

10. The AC-DC conversion circuit of claim 1, wherein the adaptive rectifier is configured to operate as a voltage doubler rectifier when the AC input voltage is in the low voltage range, and to operate as a buck circuit when the AC input voltage is in the high voltage range.

11. The AC-DC conversion circuit of claim 1, wherein the adaptive rectifier comprises:
a) a full bridge rectifier;
b) first and second capacitors coupled in series between first and second output terminals of the full bridge rectifier; and
c) a switching regulator configured to multiplex at least two rectifying diodes of the full bridge rectifier, and to convert the AC input voltage into voltages across the first and second capacitor, wherein the sum of the voltages across the first and second capacitors is taken as the DC output voltage of the adaptive rectifier.

12. The AC-DC conversion circuit of claim 11, wherein:
a) the switching regulator is configured to multiplex at least one rectifying diode of the full bridge rectifier during each positive half cycle and each negative half cycle; and
b) output voltages of the switching regulator are the voltage across the first capacitor during each positive half cycle, and the voltage across the second capacitor during each negative half cycle respectively.

13. The AC-DC conversion circuit of claim 12, wherein the switching regulator further comprises:
a) first and second input terminals of the full bridge rectifier being configured to receive the AC input voltage through the power device; and
b) wherein one terminal of the inductor and the power device are coupled to the same one of the first and second input terminals, and the other terminal of the inductor is coupled to a common node of the first and second capacitors.

14. The AC-DC conversion circuit of claim 13, further comprising a voltage detection circuit configured to generate a first signal that represents the range of the AC input voltage, thereby controlling the power device to be turned on and off in order to adjust the operation states of the adaptive rectifier.

15. The AC-DC conversion circuit of claim 14, wherein the power device is configured to be turned on according to the first signal when the AC input voltage is in the low voltage range, and to operate in the PWM mode according to the first signal when the AC input voltage is in the high voltage range.

16. The AC-DC conversion circuit of claim 15, wherein:
a) when the power device is on, the AC input voltage charges the first capacitor during each positive half cycle, and charges the second capacitor during each negative half cycle; and
b) when the power device operates in the PWM mode, a buck circuit is configured to control the voltage across the first capacitor during each positive half cycle, and to control the voltage across the second capacitor during each negative half cycle.

17. The AC-DC conversion circuit of claim 1, wherein the low voltage range of the AC input voltage is from 90V to 160V, and the high voltage range of the AC input voltage is from 190V to 290V.

18. An AC-DC conversion method, comprising:
a) receiving an AC input voltage with different ranges, wherein a power device is coupled to the AC input voltage;
b) adjusting operation states of an adaptive rectifier according to a range of the AC input voltage, in order to decrease a fluctuation range of a DC output voltage of the adaptive rectifier; and
c) when the power device is also coupled to an inductor, turning on the power device when the AC input voltage is in a low voltage range, and operating the power device in a pulse-width modulation (PWM) mode when the AC input voltage is in a high voltage range.

19. The method of claim 18, wherein:
a) the adaptive rectifier operates in a boost mode when the AC input voltage is in the low voltage range, in order to increase the DC output voltage; and
b) the DC output voltage that is generated when the AC input voltage is in the low voltage range approaches the DC output voltage that is generated when the AC input voltage is in the high voltage range.

20. The method of claim 18, wherein:
a) the adaptive rectifier operates in a buck mode when the AC input voltage is in the high voltage range, in order to decrease the DC output voltage; and
b) the DC output voltage that is generated when the AC input voltage is in the low voltage range is approaches the DC output voltage that is generated when the AC input voltage is in the high voltage range.

\* \* \* \* \*